United States Patent [19]
Slayton et al.

[11] Patent Number: 4,989,045
[45] Date of Patent: Jan. 29, 1991

[54] METHOD FOR REMOVAL AND ADDITION OF DEVELOPER TO A TONER MODULE IN AN ELECTROPHOTOGRAPHIC PRINT ENGINE

[75] Inventors: Danny L. Slayton, Lilburn; E. Neal Tompkins, Roswell; Khosrow Lak, Lawrenceville, all of Ga.; Charles S. Palm, Pasadena, Calif.

[73] Assignee: Colorocs Corporation, Norcross, Ga.

[21] Appl. No.: 345,481

[22] Filed: May 1, 1989

Related U.S. Application Data

[60] Division of Ser. No. 28,972, Mar. 23, 1987, Pat. No. 4,848,267, which is a continuation-in-part of Ser. No. 791,218, Oct. 25, 1985, Pat. No. 4,652,115.

[51] Int. Cl.$^5$ ..................... G03G 15/06; G03G 21/00
[52] U.S. Cl. ..................................... 355/260; 118/690
[58] Field of Search ............... 355/200, 210, 245, 260; 222/DIG. 1; 118/653, 690

[56] References Cited

U.S. PATENT DOCUMENTS

| | | | |
|---|---|---|---|
| 3,717,122 | 2/1973 | Hudson | 222/DIG. 1 |
| 3,841,751 | 10/1974 | Draugelis et al. | 355/327 X |
| 3,954,331 | 5/1976 | Smith | 355/260 |
| 4,147,541 | 4/1979 | Lindblad et al. | 96/1.5 |
| 4,170,195 | 10/1979 | Schon | 118/658 |
| 4,439,034 | 3/1984 | Daniels | 118/658 |
| 4,523,834 | 6/1985 | Pelda et al. | 355/260 |
| 4,583,832 | 4/1986 | Kasamura et al. | 355/260 |
| 4,601,259 | 7/1986 | Yamashita | 355/260 X |
| 4,652,115 | 3/1987 | Palm et al. | 355/327 |
| 4,845,523 | 7/1989 | Miyaji | 355/260 X |

Primary Examiner—Fred L. Braun
Attorney, Agent, or Firm—Jones, Askew & Lunsford

[57] ABSTRACT

A toner module has a mixing roller and a decorator roller. The decorator roller, which extends partially through a developer opening, has a partial magnetic core enclosed by a developer carrying sleeve. Developer is removed by orientating a nonmagnetic portion of the core toward the developer opening. The decorator roller is then rotated so that the sleeve carries the used developer over the nonmagnetic portion, thereby allowing the developer to fall out of the toner module. New developer is added by orientating the magnetic portion of the core to face the developer opening. The decorator roller is then rotated so that, as the sleeve rotates over the developer to be added, the magnetic force of the developer core pulls the developer onto the sleeve and into the toner module. Orientating a magnetic portion of the mixing roller proximate to the decorator roller causes the developer to be carried further into the toner module, so as to provide for more storage volume for the developer.

3 Claims, 3 Drawing Sheets

METHOD FOR REMOVAL AND ADDITION OF DEVELOPER TO A TONER MODULE IN AN ELECTROPHOTOGRAPHIC PRINT ENGINE

CROSS-REFERENCE TO RELATED APPLICATION.

This is a Divisional Application of application Ser. No. 028,972, filed Mar. 23, 1987, how U.S. Pat. No. 4,848,267, issued Jul. 18, 1989, which is a continuation-in-part of application Ser. No. 791,218, filed Oct. 25, 1985, now U.S. Pat. No. 4,652,115, issued Mar. 24, 1987.

TECHNICAL FIELD

The present invention relates to toner modules for use in electrophotographic print engines, and more particularly, is a toner module which provides for an improved method of removing and replacing developer.

BACKGROUND OF THE INVENTION

Electrophotography is a widely used method of information processing. Xerography is a form of electrophotography that is used to make copies of documents. Xerographic copiers are extensively used in a variety of environments, such as offices, libraries, and educational institutions.

The basic elements of a xerographic copier are well known to those skilled in the art. A light source is used to form an electrostatic image of an original document on a photosensitive medium. The photosensitive medium, as it is carried through the copier, travels adjacent to a source of tiny plastic particles. The plastic particles are called toner. The electrostatic force of the image on the photosensitive medium attracts the toner to the surface of the photosensitive medium. This provides a developed image of toner particles on the surface of the photosensitive medium. The toner image is transferred through electrostatic charges to an image receptor, which is normally a sheet of paper or plastic. The image receptor passes through a heating device which melts the toner particles thereby fixing the image of the original onto the image receptor.

A supply of the toner used to create the final image is stored in a toner module. Also within the toner module is a supply of ferromagnetic carrier particles. The toner particles are electrostatically attracted to the ferromagnetic carrier particles. The conbination of toner and ferromagnetic carrier particles is called the developer. Conventionally, a roller, comprising a sleeve rotating around a plurality of magnetic pole pieces, carries developer from the interior of the toner module to a point at which it contacts the photosensitive medium. After the electrostatic image pulls the toner away from the ferromagnetic carrier paricles, the magnetic forces within the toner module transport the ferromagnetic carrier particles back to a position where they are re-mixed with toner.

As it is well known in the art, the ferromagnetic carrier particles lose their electrostatic attractiveness through use. As time passes, some of the toner particles become imbedded in the carrier particles. As a result, the enbedded toner particles shield the electrostatic force of the carrier particles and additional toner particles will not adhere to the surface of the particles. Thus, the ferromagnetic carrier particles in the developer must be replaced periodically. As the toner particles are depleted through use, the toner in the developer must also be replaced.

With conventional toner modules, the replacement of used developer is a messy, time consuming, and costly process. To remove developer from a conventional toner module, the toner module must be opened. Blades or brushes are commonly used to scrape the developer off the magnetic surfaces within the toner module. The developer is either vacuumed or shaken out as it is being scraped. To add new developer, the developer is poured from a container directly into the toner module.

Since the developer is composed of tiny plastic and iron particles, it has the consistency of a powder. Like a powder, the slightest movement of air sends developer flying. When the developer is scraped and vacuumed or shaken from the toner module, it is inevitable that some of the developer becomes airborne and eventually settles in undesirable areas. Some of the developer settles inside the copier itself or on other equipment where the particles can cause abrasive damage. Developer can also end up on clothes or carpet where it is difficult to remove. Like developer removal, the process of adding new developer by pouring it into the toner module also has a tendency to produce airborne particles which settle in undesirable places.

In a color xerographic copier, several toner modules, each with a different color of toner, are used. The developer must periodically be replaced in each one of the toner modules. Thus, the problems mentioned above are multiplied and there is an additional problem of color contamination. Color contamination results when developer particles intended for one toner module become airborne and end up in another toner module containing a different toner color.

More recently, laser printers have become popular office machines. As is known to those skilled in the art, laser printers tend to be constructed with print engines which are substantially identical to those used in xerographic copiers. A raster-scanned laser beam is used to create the developed image directly on the photosensitive medium in a laser printer. After the image is created on the photosensitive medium, the printer process in identical to that in a xerographic copier, i.e. toner particles, which have been stored in toner modules, are deposited onto the photosensitive medium. Even more recently, color laser printers have become popular.

Therefore, there is a need for a toner module for an electrophotographic print engine or laser print engine which provides for a simpler, cleaner method of replacing developer.

SUMMARY OF THE INVENTION

The present invention solves the above-described problems in the prior art by providing a toner module that facilitates the replacement of developer without opening the toner module. Generally described, the present invention is a toner module comprising a developer opening, a carrying surface which carries the developer over a plurality of magnetized pole pieces with a portion of the carrying surface extending through the developer opening to place the toner in close proximity to a photoreceptor, means for moving the toner module away from the photoreceptor, means for orientating the toner module so that the developer opening faces downwardly, and means for moving the magnetized pole pieces away from said portion of the carrying surface so that substantially no magnetic field is present at said portion of the carrying surface.

The novel construction of the present invention facilitates the removal of used developer from the toner module by virtue of the movement of the magnetized pole pieces away from the portion of the carrying surface which extends through the developer opening. As the magnetized pole pieces are moved away, there is no longer any magnetic force to hold the developer on the carrying surface and the force of gravity pulls the developer off the carrying surface and thus, out of the toner module. A receptacle for deposit of the used developer is attached to the toner module so that no used developer can become airborne.

The novel construction of the present invention also facilitates the addition of new developer to the toner module by virtue of the movement of the carrying surface extending through the developer opening. As the carrying surface moves past a supply of developer in close proximity to the developer opening, the force of the magnetized pole pieces pulls the developer from the supply onto the carrying surface. The new developer travels with the carrying surface into the toner module where the magnetic field on the carrying source is minimal; the developer then remains within the interior of the toner module.

In a preferred form of the present invention, another novel device facilitates the addition of developer of the toner module. In this preferred form, the toner module described in the general description above further comprises a mixing roller. The mixing roller is located within the interior of the toner module in close proximity to the carrying surface. An outer sleeve of the mixing roller rotates around a core of magnetic and nonmagnetic portions.

The mixing roller facilitates the process of developer replacement by lifting the developer to a higher position within the toner module, thus allowing for a greater amount of stored developer. When the new developer is being added to the toner module, a magnetic section of the core of the mixing roller located proximate to the carrying surface pulls the new developer from the carrying surface onto the outer sleeve of the mixing roller. The new developer is then carried by the outer sleeve of the mixing roller to a stored position within the toner module.

In the most preferred form of the present invention the carrying surface and magnetized pole pieces comprise a decorator roller. Thus the decorator roller includes a core, having a magnetic portion and a nonmagnetic portion, an outer sleeve, and a longitudinal axis. It is located so that the longitudinal axis of the mixing roller is above and parallel to the longitudinal axis of the decorator roller. The preferred form of the invention further comprises a means for removing the toner module from the print engine and a means for rotating the core of the decorator roller so that the non-magnetized portion is proximate to the portion of the outer sleeve of the decorator roller extending through the developer opening.

To remove used developer from the preferred form of the invention, the toner module is removed from the print engine, a used developer receptacle is attached to the toner module such that it covers the developer opening, the decorator core is manually rotated until the nonmagnetic portion faces the developer opening, and the outer sleeve of the decorator roller and the outer sleeve of the mixing roller are rotated simultaneously. As the outer sleeve of the mixing roller passes over the nonmagnetic portion of the mixing core, the used developer falls from the force of gravity onto the decorator roller below. As the outer sleeve of the decorator roller passes over the nonmagnetic portion of the decorator core, the developer falls out of the toner module into the used developer receptacle. This rotation continues until all of the developer is removed.

New developer can then be added to the preferred form the invention by rotating the decorator core until the magnetic portion faces the developer opening. A new developer reservoir is placed below the developer opening and the outer sleeve of the decorator roller and the outer sleeve of the mixing roller are rotated simultaneously. As the outer sleeve of the decorator roller passes over the developer in the reservoir, the magnetic force of the developer core pulls the developer from the source onto the surface of the outer sleeve. The outer sleeve of the decorator roller carries the developer into the toner module. When the developer nears the outer sleeve of the mixing roller it passes over a nonmagnetic portion of the decorator core. The magnetic force of the mixing core immediately above pulls the developer from the outer sleeve of the developer roller onto the outer sleeve of the mixing roller. The outer sleeve of the mixing roller carries the developer further into the toner module. When the outer sleeve of the mixing roller passes over the nonmagnetized portion of the mixing roller core, the developer falls off the outer sleeve of the mixing roller and remains within the toner module.

The novel mixing roller takes the new developer to a higher position in the toner module, thus allowing for more storage volume and therefore a greater quantity of stored developer. The rotation continues until the toner module has an adequate supply of developer. The new developer reservoir is then removed from beneath the toner module and the toner module is inserted back into operating position within the print engine.

Therefore, it is an object of the present invention to provide a toner module that facilitates removal and replacement of used developer without opening the toner module.

It is a further object of the present invention to provide a toner module that facilitates the replacement of used developer with a minimal of developer dispersion.

It is a further object of the present invention to provide a toner module that facilitates the replacement of used developer at minimal cost.

It is a further object of the present invention to provide a toner module with a greater capacity for storing developer.

Other objects, features and advantages will become apparent from reading the following specification in conjunction with the accompanying drawings.

DETAILED DESCRIPTION

Figure 1:
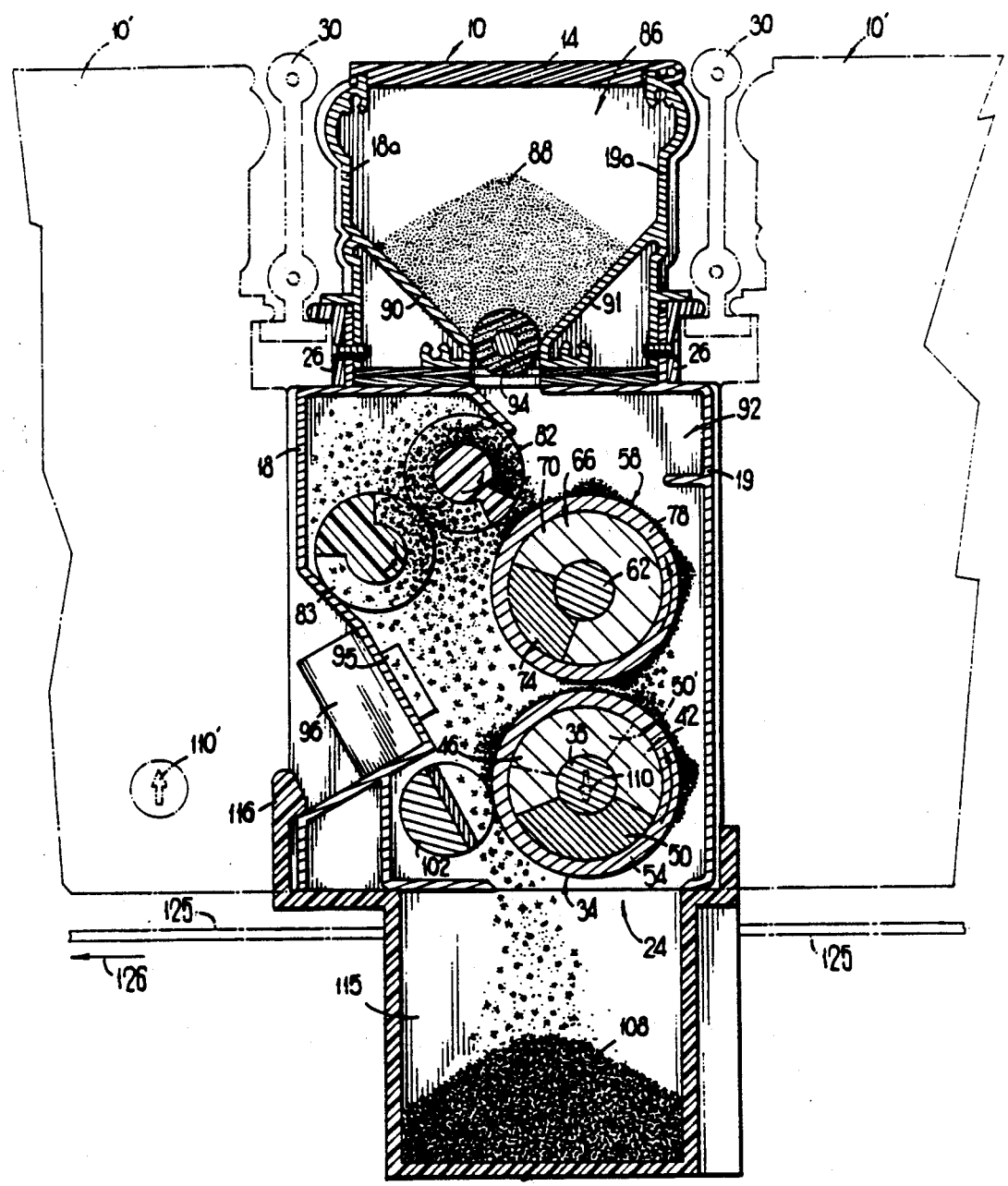
FIG. 1 is a cross-sectional view of the preferred embodiment of the toner module with the decorator roller set for developer removal and the used developer receptacle attached. In phantom is shown the toner modules on either side as the module would be placed in the print engine.
Figure 2:
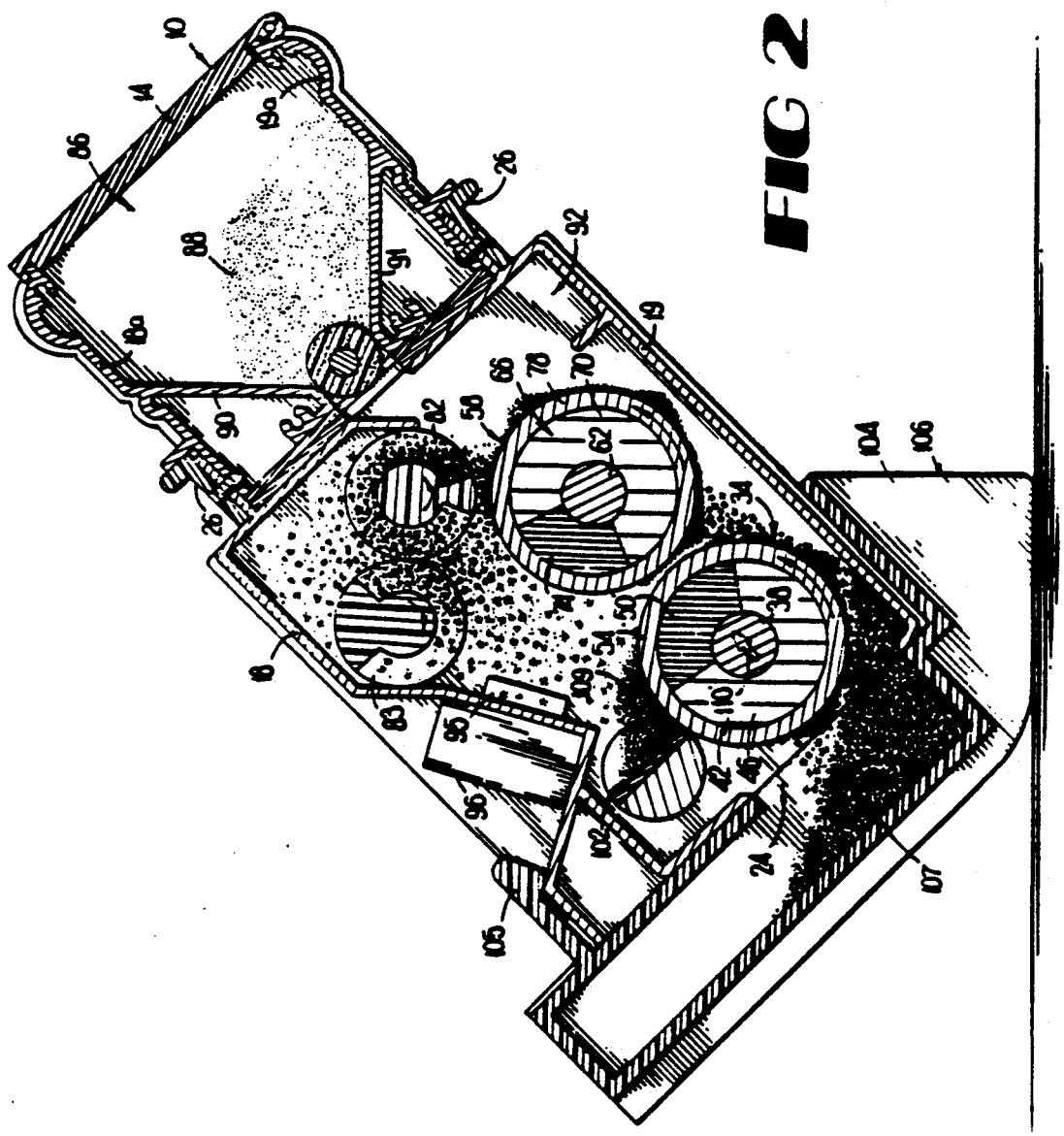
FIG. 2 is a cross-sectional view of the preferred embodiment of the toner module with the decorator roller set for developer addition and the new developer reservoir attached.
Figure 3:
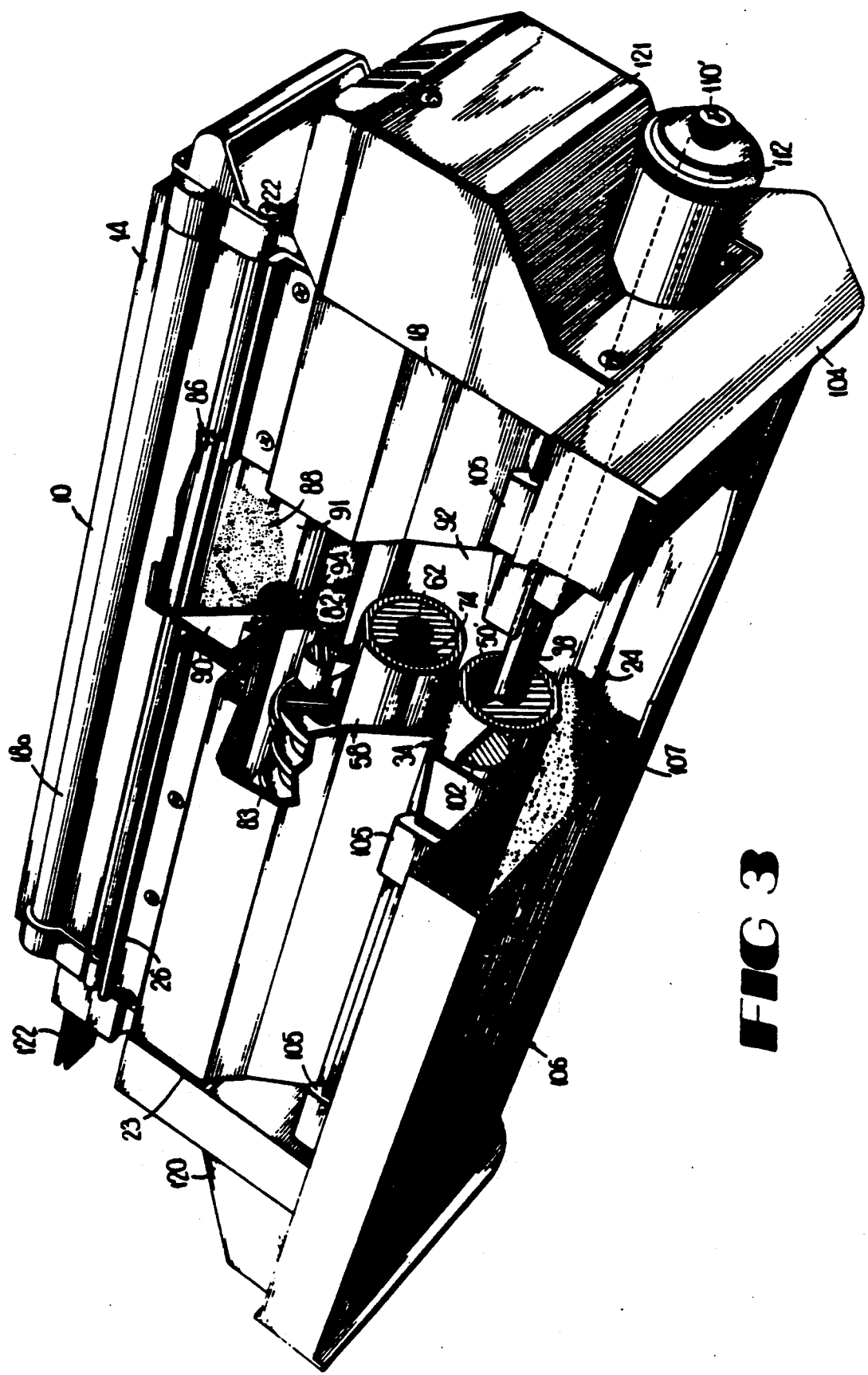
FIG. 3 is a perspective side view of the preferred embodiment of the toner module in position for new developer addition.

Turn now to the drawings, in which like numerals reference like parts throughout the several figures. FIG. 1 shows a cross-sectional view of the internal workings of the toner module wherein the controls are set for removal of used developer. In FIG. 2, the toner module is pictured in the same manner wherein the internal workings are set for the addition of new developer. FIG. 3 shows the toner module in perspective format after being slidably removed from the print engine of a xerographic copier or laser printer to a position for developer addition.

Generally, the improved toner module consists of a toner housing 10, a mixing roller 58, a decorator roller 34, a doctor blade 102, a motor (not shown) contained in motor housing 120 (FIG. 3), and a decorator core adjustment knod 110 (FIG. 3). It will be appreciated from the detailed description below that these general elements acting together without the aid of additional equipment provide for a quick and simple replacement of developer.

FIG. 1 depicts a toner module in position for disposing of used developer. In phantom, toner modules 10' are depicted in place in the print engine as they relate to toner module 10. Toner housing 10 is composed of two vertical walls 18 and 19 and a horizontal top lid 14. Front and rear plates 22 and 23 (FIG. 3) give toner housing 10 a box-like appearance with a rectangular developer opening 24 at the bottom. Also shown in phantom is a photosensitive medium, such as photoconductor belt 125, which is located below toner modules 10 and 10'. Photoconductor belt 125 is composed of photosensitive material such that, as passes under toner modules 10 and 10' during normal operation, the charge on belt 125 will hold developer deposited from modules 10 or 10'. Belt 125 moves in the direction indicated by arrow 126.

Longitudinal L-shaped brackets 26 attached to vertical plates 18 and 19 run the length of the toner module. Inverted T bars 30, pictured in phantom, fit underneath brackets 26 such that the toner module can be slid forward out of the machine when developer is being replaced. Bars 30 are T-shaped such that several toner modules 10 can be slid in alongside each other. To further aid in the ease of removal, edge plug 122 (shown in FIG. 3) is mounted on the rear of toner module 10 for electrical connections between the module and the print engine.

At the top of toner housing 10 is located toner hopper 86. As can be seen in FIG. 1, hopper 86 is composed of vertical plates 18a and 19a, top lid 14, two downward sloped edges 90 and 91, and indexing means 94. Additional toner 88 is stored in hopper 86. In the preferred embodiment, indexing means 94 is a foam roller. The indexing of foam roller 94 is controlled electronically in a manner well known in the art. This electronic control calling for additional toner to be added to mixing chamber 92 is in response to signals from toner density sensor 96. Sensor 96 is constructed such that a density sensor surface 95 is inside mixing chamber 92. Sensor surface 95 is constructed of a ferrite powder coil in a manner well known in the art. Density sensor 95 measures the per cent toner in the developer inside mixing chamber 92. Whenever the level of toner in mixing chamber 92 drops 1 per cent below the preferred percentage, toner density sensor 96 gives a signal to indexing means 94 to add a measured amount of toner 88 to mixing chamber 92. In the preferred embodiment, each index of foam roller 94 adds 0.2 grams of toner 88 to mixing chamber 92. It can be understood that indexing means 94 could also be a finned shaft or a ratchet wheel as long as one indexing of the indexing means adds a specified amount of toner 88 to mixing chamber 92. When additional toner is needed in mixing chamber 92, indexing means 94 is indexed and measured amounts of toner 88 are added to mixing chamber 92 such that the percentage of toner to developer approximates the preferred percentage.

The measured amount of toner 88 added to chamber 92 will then come into contact with two augers, 82, and 83. These augers are located in mixing chamber 92 and move the toner material backward and forward within the toner module to give an even mix between the toner and the ferromagnetic carrier particles. The pair of mixing augers 82 and 83 move the mixed combination of toner material and ferromagnetic carriers longitudinally within the mixing chamber. The pitch and direction of rotation of augers 82 and 83 are selected so that auger 83 moves developer into the page and auger 82 moves developer out of the page in the view of FIG. 1. The threads of auger 82 are spaced further apart than those of auger 83 such that auger 82 will move developer quicker longitudinally than auger 83.

After the developer is mixed by the augers, it is deposited onto mixing roller 58. Mixing roller 58 is composed of a nonmagnetic rotation outer sleeve 78, a mixing core 66, and a nonmagnetic inner section 62. The mixing core 66 is composed of a magnetic portion 70 and a nonmagnetic portion 74. The various pole orientations for the magnetic portion 70 of mixing core 66 are arranged as is well known to those skilled in the art such that, as particles on the outer sleeve 78 move around the mixing roller 58, the magnetic forces will cause the particles to alternately stand up and lie down. They then become thoroughly mixed.

Located below mixing roller 58 is decorator roller 34. Like mixing roller 58, decorator roller 34 is composed of a non-magnetized rotating outer sleeve 54, a decorator core 42 (composed of magnetized portion 46 and non-magnetized portion 50), and non-magnetized inner section 38. The decorator roller is shown in position for developer removal. Under normal operating circumstances the non-magnetized portion 50 of decorator core 42 is rotated up to position 50' shown in phantom. Connected to the decorator core is decorator core adjustment knob 110 and handle 112 (FIG. 3).

To remove developer, toner module 10 is slid forward out of the print engine (not shown) on inverted T bars 30 positioned underneath brackets 26. A used developer receptacle 115 is then attached beneath toner module 10. Three clips 116 evenly spaced longitudinally along receptacle 115 are designed in such a manner as to hold receptacle 115 firmly onto toner module 10 so that used developer 108 cannot become airborne as it is dumped into receptacle 115.

The decorator core adjustment knob 110 is located on the outside of toner module 10. It has two settings: one for normal operation and developer addition (arrow pointing up), and one for developer removal (arrow pointing down). When adjustment knob 110 is turned towards developer removal, it causes the non-magnetized portion 50 of decorator core 42 to be rotated into position as shown in FIG. 1. Edge plug 122 (FIG. 3) is connected to an external power source and the toner module motor (not shown) is then turned on causing outer sleeves 78 and 54 to rotate. Since both mixing roller 58 and decorator roller 34 rotate in a counterclockwise direction, the developer will be brought down the left-hand side of rollers 58 and 34, as shown in FIG. 1. When used developer 108 reaches the non-magnetized portion 50 of decorator core 42, there is no magnetic force to oppose gravity and the used developer 108 falls into used developer receptacle 115 located below toner module 10. Doctor blade 102 is kept in an open position so that it does not block the flow of used developer 108 out of toner module 10.

FIG. 2 shows a similar cross-sectional view of toner module 10 in the position ready for developer addition. Toner module 10 is removed from the print engine and new developer reservoir 106 is attached such that it covers developer opening 24. Three clips 105 evenly spaced longitudinally along reservoir 106 are designed in such a manner as to hold reservoir 106 firmly onto toner module 10 so that new developer 107 (a mixture of ferromagnetic carrier particles and toner at the preferred ratio) cannot become airborne. The reservoir is further designed with angle 104 so that when toner module 10 is removed from the print engine and reservoir 106 is attached, the assembly can be set at a 45% angle on a flat surface as pictured in FIG. 2. This position allows new developer 107 to lay in reservoir 106 in such a manner that it flows into toner module 10 through developer opening 24 and is brought into contact with decorator roller 38. In the preferred embodiment, reservoir 106 is constructed of clear polyurethane plastic such that the operator can observe the level of developer 107 in reservoir 106.

Doctor blade 102 is rotated into a horizontal position so that it will block the flow of new developer 107 from going back into new developer reservoir 106. As shown in FIG. 2, stored developer 109 piles up on top of doctor blade 102. In order to add new developer, decorator core adjustment knob 110 is rotated back into the normal operating position (the arrow points up 110'). This rotates non-magnetized portion of decorator core 42 into position 50' so that it is close to mixing roller 58. The motor is switched on and decorator roller 34 and mixing roller 58 begin rotating in a counterclockwise direction. Magnetic forces will pull new developer 107 from the developer source 106 and take it up the right side of decorator roller 34, as shown in FIG. 2. When new developer 107 reaches the unmagnetized portion 50 of decorator core 42, the magnetic forces from mixing core 66 pull it up onto the outer sleeve 78 of mixing roller 58. The new developer 107 is then brought up the right hand side of mixing roller 58, as shown in FIG. 2. Augers 82 and 83 and mixing roller 58 will mix new developer 107, carrying it back and forth longitudinally in mixing chamber 92. Any of the new developer falling back down the left hand side of the mixing roller will be caught by doctor blade 102 and form a pile of stored developer 109.

FIG. 3 shows a side perspective view of toner module 10 in position for developer addition. L-shaped brackets 26 allow toner module 10 to slide out of a xerographic print engine or laser printer (not shown). Rear plate 23 forms a division between toner module 10 and motor housing 120. Edge plug 122 is located above motor housing 120 and contains the electrical connections for the motor, the sensor and the solenoid. Decorator core adjustment knob 110 and handle 112 are shown as they are connected through front panel 22 and doctor bladesolenoid housing 121 to decorator core 42 of decorator roller 34. The perspective is such that one can view outer sleeve 54 of decorator roller 34 through developer opening 24.

Decorator core adjustment knob 110 is shown in the developer addition position (110') with the toner module ready for developer addition. New developer reservoir 106 with new developer 107 is pictured located below outer sleeve 54 of decorator roller 34. Clips 105 are shown as they would firmly attach receptacle 106 to toner module 10.

From the foregoing description of the preferred embodiment, and several alternative embodiment, it will be appreciated that the present invention overcomes the drawbacks of the prior art and meets the objects of the invention cited hereinabove. In view of the teachings of this specification, other alternative embodiments will suggest themselves to those skilled in the art and therefore the scope of the present invention is to be limited only by the claims below.

We claim:

1. A method of removing developer from an electrophotographic print engine toner module of the type including a developer opening and a carrying surface, a portion of said carrying surface extending through said developer opening in close proximity to a photoreceptor and over a plurality of magnetized pole pieces, comprising the step of:
   (1) moving said toner module away from said photoreceptor;
   (2) orientating said toner module so that said developer opening faces downwardly;
   (3) moving said magnetized pole pieces away from said portion of said carrying surface so that substantially no magnetic force is present at said portion of said carrying surface; and
   (4) rotating said carrying surface such that said developer will be carried to said portion of said carrying surface extending through said developer opening where substantially no magnetic force is present thereby allowing said developer to fall out of said module.

2. A method of replacing developer in an electrophotographic print engine toner module of the type including a developer opening and a carrying surface over a plurality of magnetized pole pieces, a portion of said carrying surface extending through said developer opening, comprising the steps of:
   (1) placing said developer opening proximate a supply of developer;
   (2) orientating said magnetized pole pieces toward said portion of said carrying surface extending through said developer opening; and
   (3) moving said carrying surface past said supplied developer and into the interior of said module, thereby allowing said developer to be brought into said module.

3. A method of replacing developer in an electrophotographic print engine toner module of the type including a developer opening and a carrying surface enclosing a plurality of magnetized pole pieces, a portion of said carrying surface extending through said developer opening, comprising the steps of:
   (1) providing a mixing roller, comprising an outer sleeve and a core having a magnetic portion and a nonmagnetic portion, within the interior of said toner module with said magnetic portion of said core proximate said carrying surface;

(2) placing said developer opening proximate a supply of developer;
(3) orientating said magnetized pole pieces toward said portion of said carrying surface extending through said developer opening; and
(4) moving said carrying surface past said supply of developer and into the interior of said module, thereby allowing said developer to be brought into said module.

* * * * *